US011314561B2

(12) United States Patent
Copier et al.

(10) Patent No.: US 11,314,561 B2
(45) Date of Patent: Apr. 26, 2022

(54) BOTTLENECK DETECTION FOR PROCESSES

(71) Applicant: UiPath, Inc., New York, NY (US)

(72) Inventors: Martijn Copier, Eindhoven (NL); Roeland Johannus Scheepens, Eindhoven (NL)

(73) Assignee: UiPath, Inc., New York, NY (US)

( * ) Notice: Subject to any disclaimer, the term of this patent is extended or adjusted under 35 U.S.C. 154(b) by 150 days.

(21) Appl. No.: 16/816,184

(22) Filed: Mar. 11, 2020

(65) Prior Publication Data

US 2021/0286658 A1   Sep. 16, 2021

(51) Int. Cl.
*G06F 9/46* (2006.01)
*G06F 9/52* (2006.01)

(52) U.S. Cl.
CPC .................................. *G06F 9/524* (2013.01)

(58) Field of Classification Search
CPC ....................................................... G06F 9/524
See application file for complete search history.

(56) References Cited

U.S. PATENT DOCUMENTS

| | | |
|---|---|---|
| 2002/0038228 A1 | 3/2002 | Waldorf et al. |
| 2003/0236585 A1 | 12/2003 | Kao et al. |
| 2005/0125249 A1 | 6/2005 | Takubo et al. |
| 2009/0177642 A1 | 7/2009 | Chung et al. |
| 2012/0259792 A1 | 10/2012 | Duan et al. |
| 2014/0281726 A1 | 9/2014 | Garrett et al. |
| 2016/0188696 A1 | 6/2016 | Belghiti |

FOREIGN PATENT DOCUMENTS

| | | |
|---|---|---|
| CN | 106209893 A | 12/2016 |
| GB | 2515118 A | 12/2014 |
| WO | 2019-094891 A1 | 5/2019 |

OTHER PUBLICATIONS

International Search Report and Written Opinion dated Dec. 30, 2020, in connection with International Patent Application No. PCT/US2020/050932, filed Sep. 16, 2020, 11 pgs.

(Continued)

*Primary Examiner* — Gregory A Kessler
(74) *Attorney, Agent, or Firm* — Chiesa Shahinian & Giantomasi PC

(57) ABSTRACT

Systems and methods for analyzing an event log for a plurality of instances of execution of a process to identify a bottleneck are provided. An event log for a plurality of instances of execution of a process is received and segments executed during one or more of the plurality of instances of execution are identified from the event log. The segments represent a pair of activities of the process. For each particular segment of the identified segments, a measure of performance is calculated for each of the one or more instances of execution of the particular segment based on the event log, each of the one or more instances of execution of the particular segment is classified based on the calculated measures of performance, and one or more metrics are computed for the particular segment based on the classified one or more instances of execution of the particular segment. The identified segments are compared with each other based on the one or more metrics to identify one of the identified segments that is most likely to have a bottleneck.

20 Claims, 12 Drawing Sheets

(56) References Cited

OTHER PUBLICATIONS

Chen et al., "A Method of Business Process Bottleneck Detection," Dec. 2019, Parallel Architectures, Algorithms and Programming, pp. 249-261.
Nil van der Aalst, "Process Mining," vol. 5, 2016, pp. 2, 6, 7, 14, 25.
Denisov et al., "Unbiased, Fine-Grained Description of Processes Performance from Event Data," Business Process Management, 2018, pp. 139-157.
GF Jenks, "Optimal Data Classification for Choropleth Maps Occasional," Paper No. 2, University of Kansas, Department of Geography, 1977. Retrieved from Wikipedia—the free encyclopedia at https://en.wikipedia.org/wiki/Jenks_natural_breaks_optimization, page last edited on Feb. 2, 2020, 4 pgs.
Osaragi, "Classification Methods for Spatial Data Representation," Paper 40, Jan. 2008, Centre for Advanced Spatial Analysis, University College London, pp. 169-184.
Cowan, "The Magical No. 4 in Short-Term Memory: A Reconsideration of Mental Storage Capacity," Behavioral and Brain Sciences (2000) 24, pp. 87-185.
Cohen, "Statistical Power Analysis for the Behavioral Sciences," 2nd Edition, Routledge, May 2013, 579 pgs.

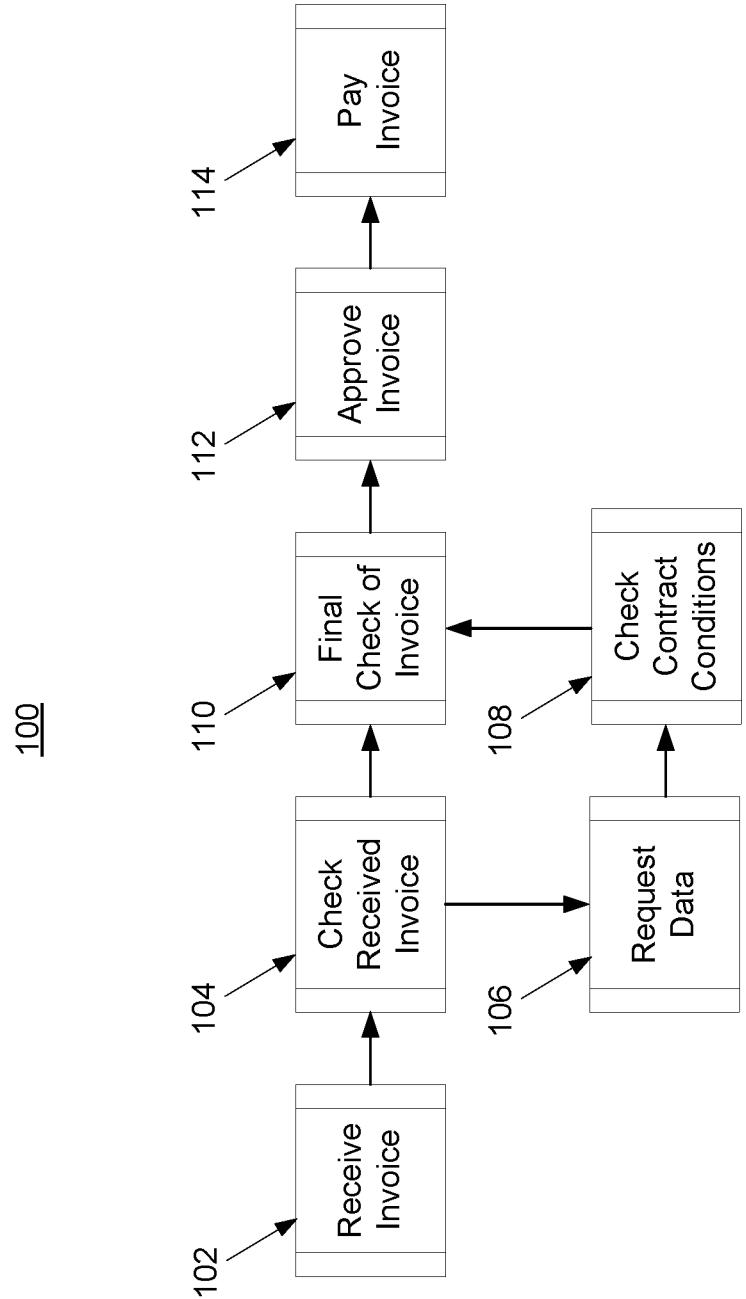

```
Receive an event log for a plurality of instances of execution
of a process
202
          │
          ▼
Identify segments executed during one or more of the
plurality of instances of execution from the event log
204
          │
          ▼
Calculate a measure of performance for each of the one or
more instances of execution of a particular segment based
on the event log
206
          │
          ▼
Classify each of the one or more instances of execution of
the particular segment into one of a plurality of classes
based on the calculated measures of performance
208
          │
          ▼
Compute one or more metrics for the particular segment
based on the classified one or more instances of execution
of the particular segment
210
          │
          ▼
    Remaining segments?      Yes
          212         ─────────►  (back to 206)
          │ No
          ▼
Compare the identified segments with each other based on
the one or more metrics to identify a bottleneck in at least
one of the identified segments
214
          │
          ▼
Output results of the comparing
216
```

| Case ID | Activity | Time Stamp |
|---------|----------|------------|
| 1 | Receive Invoice | 01/01/2020 10:00:00 |
| 1 | Check Received Invoice | 01/01/2020 10:00:02 |
| 1 | Final Check of Invoice | 03/01/2020 13:00:12 |
| 1 | Approve Invoice | 05/01/2020 9:35:15 |
| 1 | Pay Invoice | 06/01/2020 16:25:54 |
| 2 | Receive Invoice | 04/01/2020 14:12:35 |
| 2 | Check Received Invoice | 04/01/2020 14:12:42 |
| 2 | Request Data | 07/01/2020 12:09:16 |
| 2 | Check Contract Conditions | 07/01/2020 12:10:25 |
| 2 | Final Check of Invoice | 09/01/2020 15:08:15 |
| 2 | Approve Invoice | 09/25/2020 10:15:15 |
| 2 | Pay Invoice | 10/15/2020 17:25:55 |

| Segment 402 | Effect size 404 | Lost time 406 | Weighted impact 408 | Effect size ranking 410 | Lost time ranking 412 | Weighted impact ranking 414 | Cumulative ranking 416 |
|---|---|---|---|---|---|---|---|
| <A, B> | 1.44 | 10000 | 82% | 7 | 7 | 6 | 20 |
| <B, C> | 0.59 | 400 | 85% | 2 | 2 | 7 | 11 |
| <C, D> | 1.21 | 8000 | 13% | 6 | 4 | 2 | 9 |
| <A, C> | 0.95 | 2000 | 4% | 5 | 6 | 1 | 12 |
| <C, E> | 0.51 | 500 | 45% | 1 | 3 | 4 | 8 |
| <D, E> | 0.73 | 250 | 20% | 3 | 1 | 3 | 7 |
| <B, E> | 0.85 | 4000 | 60% | 4 | 5 | 5 | 14 |

700

① Segment overview    Segment information    Case attributes    Event Attributes    Compare Process Flow

Segment Name    Checked and approved --> Pay invoice    ▼    Select Class    1    ▼

Expected vs. Actual Attribute Frequency
We expect to see 43.24% cases containing the attribute value ② Case Attribute:    Case type    ▼    +    ☐ Only show significant ③ Case type    ▼ Expression

710

| Case type | Bar | % | Total |
|---|---|---|---|
| Partner | | 61% | 121 |
| Small invoice | | 47% | 1,768 |
| Medium invoice | | 32% | 157 |
| Preferred supplier | | 25% | 430 |

④ How is the attribute divided over the classes?

Percentage / Count:    Percentage    ▼

| ▲Class | High-level invoice | Medium invoice | Partner | Preferred supplier | Small invoice | #Cases |
|---|---|---|---|---|---|---|
| 1 | 1% | 5% | 7% | 10% | 78% | 1,075 |
| 2 | 0% | 8% | 4% | 18% | 70% | 873 |
| 3 | | 6% | 1% | 34% | 58% | 339 |
| 4 | | 10% | 3% | 25% | 63% | 199 |

Segment overview  Segment information  Case attributes  Event Attributes  Compare Process Flow 802 → ① Segment Name  Check received invoice --> Final check of invoice ▶

804 → What event attributes does the Segment have?
806 → Shows only attribute count of segment event "Final check of invoice"

② Event Attribute: Country ▶    ③ Percentage / Count: Percentage ▶

| Class | Austria | France | Germany | Netherlands | Switzerland | UK | US | Total |
|---|---|---|---|---|---|---|---|---|
| 1 | 12% | 8% | 20% | 18% | 20% | 14% | 7% | 100% |
| 2 | 13% | 9% | 20% | 19% | 17% | 15% | 8% | 100% |
| 3 | 28% | 1% | 35% | 7% | 21% | 6% | 3% | 100% |
| 4 | 83% | | 1% | 3% | 13% | | | 100% |
| 5 | 64% | | | 7% | 7% | 14% | 7% | 100% |

808 → What event attributes does the Overall Process have?

④ Percentage\Count: Percentage ▶

| Class | Austria | France | Germany | Netherlands | Switzerland | UK | US | Total |
|---|---|---|---|---|---|---|---|---|
| 1 | 5% | 18% | 29% | 7% | 8% | 28% | 5% | 100% |
| 2 | 5% | 15% | 29% | 6% | 8% | 32% | 5% | 100% |
| 3 | 8% | 4% | 41% | 5% | 7% | 30% | 4% | 100% |
| 4 | 17% | 3% | 37% | 1% | 3% | 35% | 4% | 100% |
| 5 | 14% | 6% | 38% | 2% | 2% | 37% | 2% | 100% |

FIG. 8

BOTTLENECK DETECTION FOR PROCESSES

TECHNICAL FIELD

The present invention relates generally to process mining, and more particularly to bottleneck detection for processes.

BACKGROUND

Processes are sequences of activities performed to provide products or services. In process mining, processes are analyzed to identify trends, patterns, and other process analytical measures in order to improve efficiency and gain a better understanding of the processes. However, current process mining techniques do not provide sufficient analytical data on the performance of processes to enable the identification of bottlenecks in the processes. Such bottlenecks limit the performance of the processes and can result in unnecessary delays, loss in revenue, and user dissatisfaction.

BRIEF SUMMARY OF THE INVENTION

In accordance with one or more embodiments, systems and methods for analyzing a process to identify a bottleneck are provided. An event log is maintained during multiple instances of execution of the process. The event log identifies segments executed during the multiple instances of execution, where each of the segments represents a pair of activities of the process. A metric for each of the identified segments is computed and one of the identified segments that is most likely to have the bottleneck is identified based on the metrics. The process may be a robotic process automation process.

In one embodiment, an event log for a plurality of instances of execution of a process is received and segments executed during one or more of the plurality of instances of execution are identified from the event log. The segments represent a pair of activities of the process, the pair of activities including a source activity and a destination activity, where execution of the destination activity directly follows execution of the source activity in the event log. For each particular segment of the identified segments, a measure of performance is calculated for each of the one or more instances of execution of the particular segment based on the event log, each of the one or more instances of execution of the particular segment is classified based on the calculated measures of performance, and one or more metrics are computed for the particular segment based on the classified one or more instances of execution of the particular segment. The identified segments are compared with each other based on the one or more metrics to identify one of the identified segments that is most likely to have a bottleneck.

In one embodiment, the measure of performance is a time interval between the pair of activities.

In one embodiment, each of the one or more instances of execution of the particular segment are classified into one of the plurality of classes using a Jenks Natural Breaks Optimization algorithm. The one or more metrics for the particular segment are computed by computing 1) an effect size metric for the particular segment representing an average difference between classes of the particular segment, 2) a lost time metric for the particular segment representing a time difference between a best performing class and other classes of the particular segment, and 3) a weighted impact metric representing contribution of the particular segment to an overall performance.

In one embodiment, the identified segments are compared with each other by ranking the identified segments based on the one or more metrics. The identified segments may be ranked by determining an individual ranking of the identified segments for each of the effect size metric, the lost time metric, and the weighted impact metric and determining an aggregate ranking of the identified segments by combining the individual rankings. One of the segments that is most likely to have a bottleneck may be identified based on the aggregate ranking.

In one embodiment, results of the comparing are caused to be displayed.

These and other advantages of the invention will be apparent to those of ordinary skill in the art by reference to the following detailed description and the accompanying drawings.

BRIEF DESCRIPTION OF THE DRAWINGS

FIG. 1 shows an illustrative process which may be analyzed for bottleneck detection, in accordance with one or more embodiments of the invention;

FIG. 2 shows a method for analyzing a process for bottleneck detection, in accordance with one or more embodiments of the invention;

FIG. 3 shows an exemplary event log of the process of FIG. 1, in accordance with one or more embodiments of the invention;

FIG. 4 shows an exemplary table for ranking segments, in accordance with one or more embodiments of the invention;

FIG. 7 shows a dashboard of a case perspective of the analysis of a process, in accordance with one or more embodiments of the invention;

FIG. 8 shows a dashboard for an organization perspective of the analysis of a process, in accordance with one or more embodiments of the invention;

DETAILED DESCRIPTION

Figure 5:
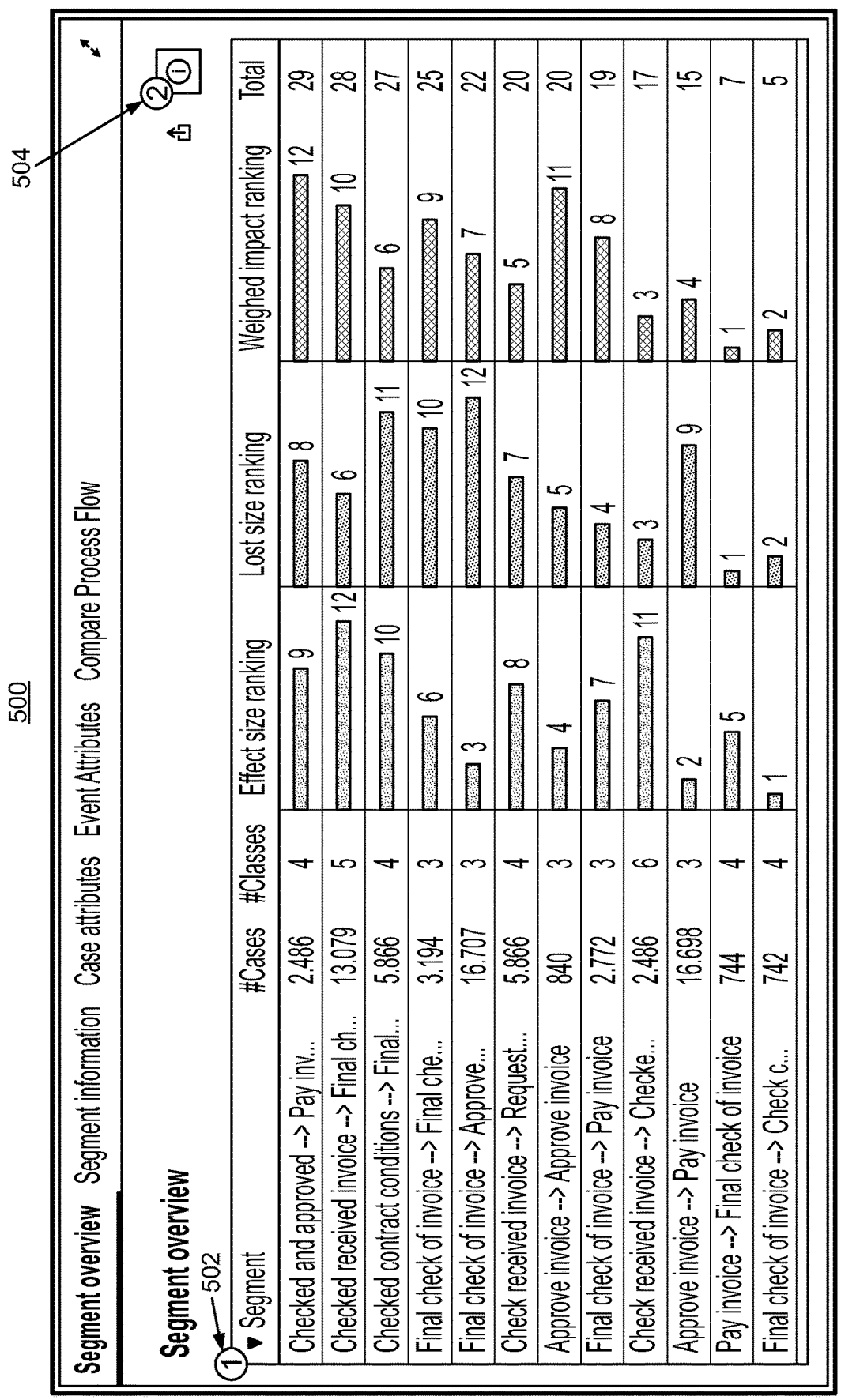
FIG. 5 shows a dashboard of a segment overview, in accordance with one or more embodiments of the invention.

Processes may be utilized to provide products or services for a number of different applications. Exemplary applications of such processes include administrative applications (e.g., onboarding a new employee), procure-to-pay applications (e.g., purchasing, invoice management, and facilitating payment), and information technology applications (e.g., ticketing systems). An exemplary process 100 is shown in FIG. 1. Process 100 is a business process for processing and paying invoices. In one embodiment, process 100 may be implemented as a robotic process automation (RPA) workflow for automatically performing a task using one or more RPA robots.

Process 100 comprises activities 102-114, which represent a predefined sequence of steps in process 100. As shown in FIG. 1, process 100 is modeled as a directed graph where each activity 102-114 is represented as a node and each transition between activities 102-114 is represented as edges linking the nodes. The transition between activities represents the execution of process 100 from a source activity to a destination activity. Process 100 starts at Receive Invoice activity 102 and proceeds to Check Received Invoice activity 104. If the received invoice is determined to be missing information at Check Received Invoice activity 104, process 100 proceeds to Request Data activity 106 and Check Contract Conditions activity 108 before proceeding to Final Check of Invoice activity 110. If the received invoice is determined to not be missing information at Check Received Invoice activity 104, process 100 proceeds directly to Final Check of Invoice activity 110. Process 100 then proceeds to Approve Invoice activity 112 and Pay Invoice activity 114. Execution of process 100 is recorded in the form of an event log.

At times, the execution of process 100 may be hindered due to bottlenecks. As used herein, a bottleneck refers to a set of one or more activities of process 100 that negatively affects the execution of process 100. The execution of process 100 may be negatively affected based on any suitable metric, such as, e.g., throughput (i.e., execution) time, resource usage, revenue, support resolution time, or any other performance indicator. For example, the execution of process 100 may be negatively affected based on any metric, such as a maximum throughput time, a minimal resource usage, a minimal revenue growth, revenue growth, support resolution time, etc. Such bottlenecks limit the execution of process 100 and can result in unnecessary delays, loss in revenue, and user dissatisfaction.

In accordance with embodiments of the present invention, processes (e.g., process 100) are analyzed to identify bottlenecks in the processes. Various aspects of the analysis may be visualized in one or more dashboards to facilitate the identification of the root cause of the bottlenecks. Advantageously, the analysis of processes to identify bottlenecks in accordance with embodiments of the present invention enables the root cause of such bottlenecks to be alleviated or eliminated, thereby improving efficiency and performance of the processes.

FIG. 2 shows a method 200 for analyzing a process for bottleneck identification, in accordance with one or more embodiments. FIG. 2 will be described with continued reference to process 100 of FIG. 1. In one embodiment, the steps of method 200 are performed to analyze process 100 for bottleneck detection. The steps of method 200 may be performed by any suitable computing device, such as, e.g., computer 1200 of FIG. 12.

At step 202, an event log for a plurality of instances of execution of a process is received. The event log may be maintained during the plurality of instances of execution of the process by recording events occurring during the plurality of instances of execution of the process. An event refers to the execution of an activity at a particular time and for a particular case. A case corresponds to a single instance of execution of the process and is identified by a case identifier (ID). In one embodiment, each event may be represented as a tuple comprising a label of an activity that was executed, a time stamp of the execution of the activity, and a case ID identifying the instance of execution of the executed activity.

FIG. 3 shows an exemplary event log 300 of process 100 of FIG. 1, in accordance with one or more embodiments. Event log 300 records events occurring during two instances of execution of process 100, corresponding to case ID 1 and case ID 2 in event log 300. As shown in FIG. 3, event log 300 is formatted as a table having rows 302 each corresponding to an event and columns 304 each identifying an attribute of the event at a cell at which rows 302 and columns 304 intersect. In particular, each row 302 is associated with an event representing the execution of an activity 102-114 (identified in column 304-B), a time stamp of the execution of the activity 102-114 (identified in column 304-C), and a case ID identifying the instance of execution of the executed activity 102-114 (identified in column 304-A). In one embodiment, the time stamp of the execution of the activity 102-114, identified in column 304-C, refers to the time at which execution of the activity 102-114 completed, but may alternatively refer to the time at which execution of the activity 104-114 started. In one embodiment, event log 300 only identifies a label of an executed activity, a time stamp of the execution of the activity, and a case ID identifying the instance of execution of the executed activity for each event, as shown in FIG. 3. However, it should be understood that event log 300 may be in any suitable format and may include additional columns 304 identifying other attributes of events.

At step 204, segments executed during one or more of the plurality of instances of execution of the process are identified from the event log. Each segment represents a pair of activities in the process. The pair of activities comprise a source activity and a destination activity, denoted herein as <source activity, destination activity>, where execution of the destination activity directly follows execution of the source activity in the event log. The segments are identified by traversing each instance of execution in the event log to identify pairs of activities. In one example, the following segments may be identified in event log 300 of FIG. 3: <Receive Invoice, Check Received Invoice>, <Check Received Invoice, Final Check of Invoice>, <Check Received Invoice, Request Data>, <Request Data, Check Contract Conditions>, <Check Contract Conditions, Final Check of Invoice>, <Final Check of Invoice, Approve Invoice>, and <Approve Invoice, Pay Invoice>.

At step 206, a measure of performance is calculated for each of the one or more instances of execution of a particular segment, of the identified segments, based on the event log. In one embodiment, the measure of performance for a specific instance of execution of the particular segment is a time interval between the source activity and the destination activity of the segment for that specific instance of execution. The time interval may be calculated by extracting a time stamp of the execution of the source activity and a time stamp of the execution of the destination activity for the specific instance of execution from the event log and determining a difference between the time stamp of the execution of the destination activity and the time stamp of the execution of the source activity. For example, the time interval associated with the segment <Check Received Invoice, Final Check of Invoice> for the instance of execution of case ID 1 may be calculated from event log 300 of FIG. 3 as 2 days, 3 hours, and 10 seconds. In another example, the time interval associated with the segment <Final Check of Invoice, Approve Invoice > for the instance of execution of case ID 1 may be calculated from event log 300 of FIG. 3 as 1 days, 20 hours, and 35 minutes, and 3 seconds. The time interval may be in any suitable format, such as, e.g., seconds, minutes, hours, days, month, and/or years. Other measures of performance may also be employed, such as, e.g., resource usage value, revenue values, occupancy rate, or any other suitable measure that is based on a numeric value and can be calculated/measured for the source activity and the destination activity individually.

At step 208, each of the one or more instances of execution of the particular segment is classified into one of a plurality of classes based on the calculated measures of performance. In one embodiment, each of the one or more instances of execution of the particular segment is classified into one of the plurality of classes using the well-known Jenks Natural Breaks Optimization algorithm, which works by minimizing the variance within each class. The Jenks Natural Breaks Optimization algorithm is described in "Optimal Data Classification for Choropleth Maps" by George F. Jenks. Any other suitable data clustering algorithm may also be employed.

The Jenks Natural Breaks Optimization algorithm divides a dataset Q, comprising the measures of performance of the one or more instances of execution of the particular segment, into n classes $Q_i$ of similar performance by iteratively breaking up the dataset using different breakpoints delineating the classes. For example, consider the segment <Receive Invoice, Check Received Invoice> executed during six instances of execution with time intervals of 7600, 3480, 220, 500, 1500, and 1700. Given dataset Q=[7600, 3480, 220, 500, 1500, 1700], the Jenks Natural Breaks Optimization algorithm tries to create an optimal division of Q into n predetermined number of classes. In this example, n=3. The Jenks Natural Breaks Optimization algorithm applies steps 1-5 as follows.

Step 1: sort dataset Q and arbitrarily (e.g., randomly) select breakpoints. Accordingly, the sorted dataset Q=[220, 500, 1500, 1700, 3480, 7600] with arbitrarily selected breakpoints results in classes $Q_{bp}$=[220], [500, 1500, 1700, 3480], [7600].

Step 2: calculate the sum of squared deviations for array mean (SDAM) for each class $Q_{bp}$. The SDAM may be calculated according to Equation 1.

$$\text{SDAM} = \Sigma_{i=1}^{N}(Q_i - \mu)^2, \text{ where } \mu = \text{mean}(Q). \quad \text{(Equation 1)}$$

Applying Equation 1 to the sorted dataset Q results in the following:

$$\text{SDAM} = (220-2500)^2 + (500-2500)^2 + (1500-2500)^2 + (1700-2500)^2 + (3480-2500)^2 + (7600-2500)^2 = 37,808,800$$

Step 3: calculate the sum of squared deviations between classes (SDBC) for every class $Q_{bp}$. The SDBC may be calculated for every class $Q_{bp}$ according to Equation 2.

$$\text{SDBC} = \Sigma_{i=1}^{N}(Q_{bpi} - \mu)^2, \text{ where } \mu = \text{mean}(Q_{bp}). \quad \text{(Equation 2)}$$

Applying Equation 2 to each class $Q_{bp}$ results in the following:

$$\text{SDBC} = (220-220)^2 + \{(500-1795)^2 + (1500-1795)^2 + (1700-1795)^2 + (3480-1795)^2\} + (7600-7600)^2 = 4,612,300$$

Step 4: calculate the sum of squared deviations for class means (SDCM) for every class $Q_{bp}$. The SDCM may be calculated for every class $Q_{bp}$ according to Equation 3.

$$\text{SDCM} = \text{SDAM} - \text{SDBC}. \quad \text{(Equation 3)}$$

Applying Equation 3 results in SDCM=37,808,800−4,612,300=33,196,500.

Step 5: repeat steps 2-4 for every possible breakpoint combination. The breakpoint combination with the highest SDCM is selected. Accordingly, each of the one or more instances of execution of the particular segment is classified into one of the plurality of classes defined by the breakpoint combination with the highest SDCM.

In one embodiment, an optimal number n of classes may be determined by repeatedly performing the Jenks Natural Breaks Optimization algorithm on dataset Q for different numbers of classes. For example, the Jenks Natural Breaks Optimization algorithm may be repeatedly performed for a number of classes of n=1, . . . , x, where x is the number of items in dataset Q. In this example, x=6. The Jenks Natural Breaks Optimization algorithm provides a Goodness of Variance Fit (GVF) measure for each number of classes. The GVF measure may be calculated as GVF=(SDAM−SCDM)/SDAM, where a GVF measure of 0 indicates no fit and a GVF measure of 1 indicates perfect fit. Maximizing the GVF will always result in the optimal number of classes equaling the number of items in dataset Q (i.e., GVF=1). Accordingly, a Rate of Goodness-of-Variance-Fit Change (RGVFC) measure is calculated denoting the rate of change between the GVF for n classes and the GVF for n+1 classes. The RGVFC for n classes is calculated as RGVFC=(GVF$_{+1}$−GVF$_n$)/GVF$_n$. The optimal number of classes is selected as the number of classes n having a maximum GVF value but with an RGVFC value that does not exceed an RGVFC threshold value. In one embodiment, the RGVFC threshold value is between 2.5% and 10%, but any suitable value may be employed.

At step 210, one or more metrics are computed for the particular segment based on the classified one or more instances of execution of the particular segment. The one or more metrics may include any suitable metric that characterizes the particular segment. In one embodiment, the one or more metrics include effect size, lost time, and weighted impact. Any other suitable metric may also be employed, such as, e.g., class size, class direction (are the classes increasing/decreasing), class distribution, etc.

Effect Size: The effect size is a quantitative measure of the difference between two classes in the particular segment. In one embodiment, the effect size is computed according to the well-known Cohen's d method, however any other suitable approach may be employed. The Cohen's d method is described in "Statistical Power Analysis for the Behavioral Sciences," by Jacob Cohen. The Cohen's d value of classes $X_1$ and $X_2$ is computed according to Equation 4:

$$d = \frac{\overline{x_1} - \overline{x_2}}{s} = \frac{\mu_1 - \mu_2}{s} \quad \text{(Equation 4)}$$

where $\mu_1$ and $\mu_2$ are the mean of $X_1$ and $X_2$ respectively, and s is the pooled standard deviation. The pooled standard deviation s is defined in Equation 5:

$$S = \sqrt{\frac{(n_1 - 1)s_1^2 + (n_2 - 1)s_2^2}{n_1 + n_2 - 2}} \quad \text{(Equation 5)}$$

where $n_1$ and $n_2$ are the size of $X_1$ and $X_2$ respectively and $s_1^2$ and $s_2^2$ are the variances of $X_1$ and $X_2$ respectively. $s_1^2$ and $s_2^2$ are defined in Equations 6 and 7 respectively:

$$S_1^2 = \frac{1}{n_1 - 1} \sum_{i=1}^{n_1} (x_1, i - \overline{x_1})^2 \quad \text{(Equation 6)}$$

$$S_2^2 = \frac{1}{n_2 - 1} \sum_{i=1}^{n_2} (x_2, i - \overline{x_2})^2 \quad \text{(Equation 7)}$$

The Cohen's d value represents the number of standard deviations that the two classes differ by. For example, a Cohen's d value of 1 indicates that the two classes differ by 1 standard deviation, a Cohen's d value of 2 indicates that the two classes differ by 2 standard deviations, etc.

The Cohen's d method only calculates the effect size (i.e., Cohen's d value) between two classes at a time. To calculate the Cohen's d value of the particular segment, which may have more than two classes, the effect size of every combination of pairs of classes is averaged. In particular, first, for the particular segment having N classes, every pair of classes ($T_i$, $T_j$) is identified, where i<j and i,j≤N. Second, the Cohen's d value is calculated for every pair of classes ($T_i$, $T_j$). Finally, the sum of the Cohen's d value for every pair of classes ($T_i$, $T_j$) is divided by the total number of pairs of classes to provide the Cohen's d value of the particular segment.

Lost Time: The lost time represents the time difference between the best performing (e.g., fastest) class and other classes in the particular segment. The lost time of the particular segment is calculated by first calculating the median of each class $C_i$ in the particular segment, where i is the class number. Second, the median of class 1 is set to be the optimal time (due to the nature of the Jenks Natural Breaks Optimization algorithm, class 1 will always have the lowest median value (i.e., fastest time)). Third, the lost time for each class $C_i$ in the particular segment is calculated as $C_i$ Lost Time=(median ($C_i$)–optimal time)*size(C). Finally, the lost time for each class $C_i$ is summed as $\sum_{i=1}^{N} C_i$ Lost Time, where N is the number of classes in the particular segment, to provide the lost time of the particular segment.

The median of the classes is used to calculate the lost time for two reasons: 1) due to the nature of the Jenks Natural Breaks Optimization algorithm, class 1 will always have the lowest median value, and 2) the median of a class is less skewed by imbalanced data as compared with the average of a class. The lost time represents the magnitude at which the one or more instances of execution of the particular segment are slower than the fastest possible time in the particular segment. Accordingly, a segment A having a relatively small lost time as compared to segment B indicates that it is more profitable to focus on improving segment B.

Weighted Impact: The weighted impact represents the percentage contribution of the overall performance of the particular segment that is caused by the segment performance of the particular segment. The total weighted impact (TWI) for segment S is calculated as in Equation 8:

$$TWI(S) = \sum_{i=1}^{C} \frac{SP(S_i)}{OP(S_i)} \frac{|S_i|}{|S|} \quad \text{(Equation 8)}$$

where C is the number of classes in segment S, $SP(S_i)$ is the segment performance of class $S_i$ in segment S, and $OP(S_i)$ is the overall performance of class $S_i$ in segment S, |S| denotes the number of cases that go through segment S, and |S| denotes the number of cases that are in class $S_i$. The segment performance is the performance (e.g., total time interval) of segment S. The overall performance is the total throughput time of cases that have segment S.

At step 212, it is determined whether there are any remaining segments of the identified segments. If it is determined that there are remaining segments, method 200 returns to step 206 and steps 206-210 are repeated using a next remaining segment as the particular segment. Accordingly, steps 206-210 are performed for each segment of the identified segments. If it is determined that there are no remaining segments, method 200 proceeds to step 214.

At step 214, the identified segments are compared with each other based on the one or more metrics to identify a bottleneck in at least one of the identified segments. In one embodiment, the identified segments are compared with each other by ranking each of the identified segments based on the one or more metrics. In one embodiment, an individual ranking of the identified segments is first determined for each of the one or more metrics. For example, an effect size ranking of the identified segments may be determined for the effect size metric, a lost time ranking of the identified segments may be determined for the potential lost time metric, and a weighted impact ranking of the identified segments may be determined for the total weighted impact metric. An aggregate ranking is then computed based on the individual rankings for the one or more metrics. For example, the aggregate ranking may comprise a cumulative ranking of the individual rankings, a weighted ranking of the individual rankings, or any other suitable ranking aggregating the individual rankings. In one embodiment, the cumulative ranking may be computed as the summation or mean of the individual rankings for the one or more metrics. The aggregate ranking represents a relative likelihood that a segment has a bottleneck as compared to other segments. A segment with the highest aggregate ranking is the most likely segment to have a bottleneck as compared to the other segments, while the segment with the lowest cumulative ranking is the least likely segment to have a bottleneck as compared to the other segments. Comparing the identified segments with each other facilitates the identification of a bottleneck in the identified segments by a user. For example, a segment with the highest aggregate ranking is the most likely segment to have a bottleneck, which may indicate that further analysis by the user is recommended to determine whether the segment has a bottleneck. In some embodiments, the rankings may also be based on an operational cost and the user may then look at segments with a highest potential risk.

FIG. 4 shows an exemplary table 400 for ranking segments, in accordance with one or more embodiments. As shown in column 402 of table 400, seven segments are identified in an event log. The effect size, potential lost time, and total weighted impact metrics are calculated for each segment, as shown in columns 404, 406, and 408, respectively. An individual rank of the segments is determined for each of the effect size, potential lost time, and total weighted impact metrics, as shown in columns 410, 412, and 416, respectively. The individual ranks of the segments range from 1 to 7, where a segment with an individual rank of 1 is the lowest ranked segment and a segment with an individual rank of 7 is the highest ranked segment. For example, segment <C, E> has the lowest effect size in column 404 and is therefore ranked the lowest (1) in column 410 while segment <A, B> has the highest effect size in column 404 and is therefore ranked the highest (7) in column 410. Segment <D, E> has the lowest potential lost time in column 406 and is therefore ranked the lowest (1) in column 412 while segment <A, B> has the highest potential lost time in column 406 and is therefore ranked the highest (7) in column 412. Segment <A, C> has the lowest total weighted impact in column 408 and is therefore ranked the lowest (1) in column 414 while segment <B, C> has the highest total weighted impact in column 408 and is therefore ranked the highest (7) in column 414. The individual rankings for each metric, in columns 410-141, are added together for each segment to calculate the cumulative ranking, as shown in column 416. Segment <A, B> has the highest cumulative ranking and is identified as the most likely segment to have a bottleneck. In some embodiments, for example, where segments with a highest effect size, highest potential lost time, and highest total weighted impact are ranked the lowest, the segment with the lowest cumulative ranking may be the most likely segment to have a bottleneck.

At step 216, results of the comparing of step 214 are output. For example, the results of the comparing can be output by displaying the results of the comparing on a display device of a computer system, storing the results of the comparing on a memory or storage of a computer system, or by transmitting the results of the comparing to a remote computer system.

In some embodiments, the results of the comparing may be output by displaying the results of the comparison of the identified segments on a display device via one or more user interfaces, such as, e.g., the dashboards shown in FIGS. 5-11. The dashboards visualize the results from a number of perspectives, including, e.g., a time perspective, a case perspective, an organization perspective, and a control-flow perspective. Such dashboards provide a user with analytical tools to facilitate analysis of segments for root-cause bottleneck analysis.

FIG. 5 shows a dashboard 500 for a segment overview, in accordance with one or more embodiments. Dashboard 500 presents an overview of each segment and its metrics to a user in region 1 502. The overview in region 1 502 is shown in tabular format, where each row corresponds to a segment and each column corresponds to an attribute. The following attributes are shown: name of segment, number of cases in that segment, number of classes in that segment, effect size ranking, potential lost time ranking, total weighted impact ranking, and cumulative ranking. The segments in region 1 502 are ordered based on their cumulative ranking, from highest to lowest. However, a user interacting with region 1 502 may sort the table based on attribute of any of the columns (e.g., by clicking a column). Region 2 504 shows an icon that (e.g., when hovered over) provides a description of how each metric is calculated.

Figure 6:
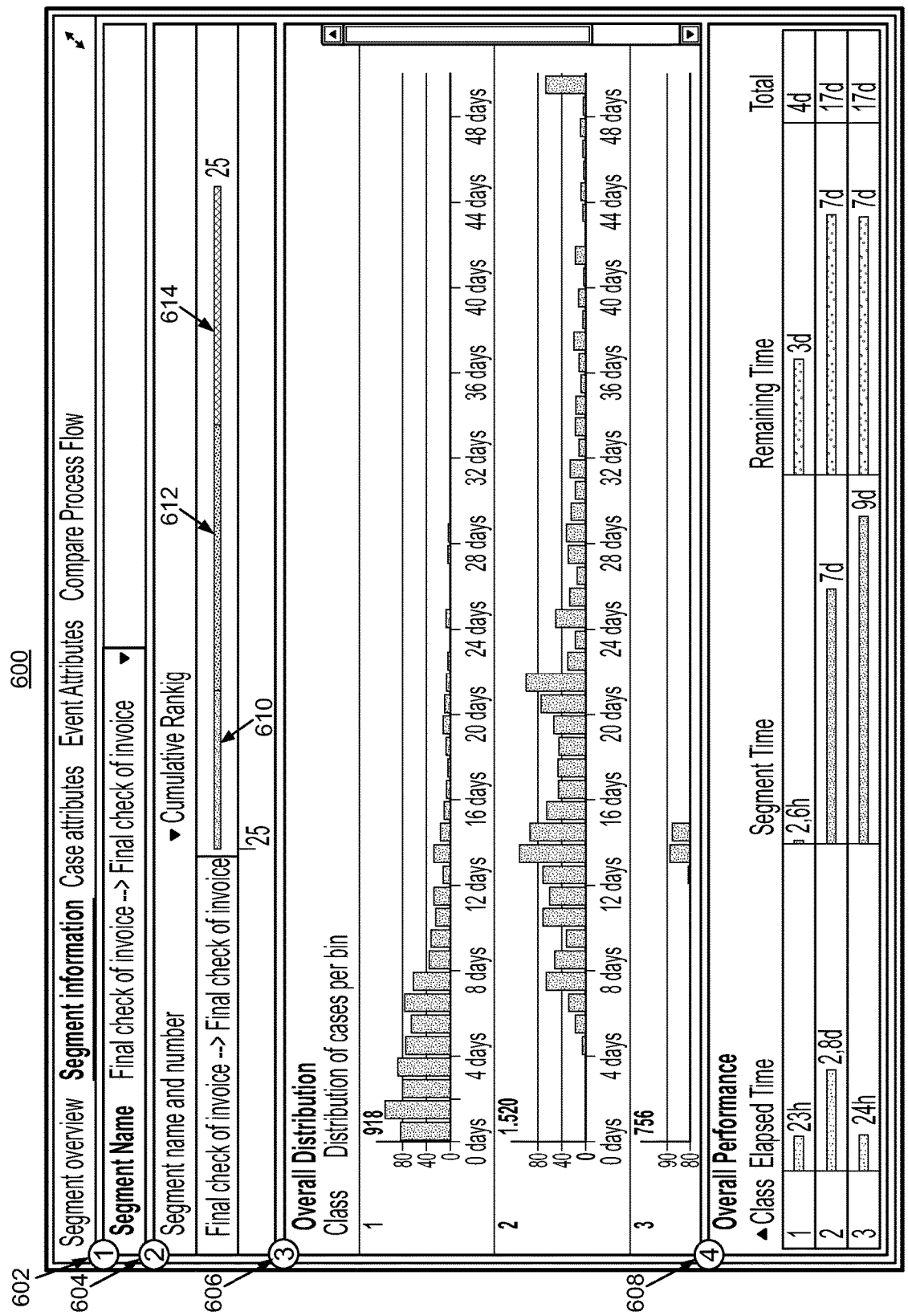
FIG. 6 shows a dashboard of a time perspective of the analysis of a process, in accordance with one or more embodiments of the invention.

FIG. 6 shows a dashboard 600 for a time perspective, in accordance with one or more embodiments. The time perspective relates to the timing and frequency of events. Timing information can be used to discover bottlenecks, measure service levels, etc. Dashboard 600 presents a detailed view of a selected segment. Region 1 602 shows a selector where a user may select the segment. Region 2 604 shows a stacked bar, where each section 610, 612, and 614 represents the value of the effect size metric, the lost time metric, and the weighted impact metric, respectively. Region 2 604 provides the user with the ability to quickly check how the selected segment was ranked relative to other segments and gain general insight on the selected segment. Region 3 606 shows the distribution of total throughput time for each case of the selected segment, per class. Region 3 606 allows the user to compare classes visually to create an understanding of the overall performance of each class. Region 4 608 shows the median throughput time for each class and how the throughput time is subdivided. In particular, region 4 608 shows elapsed time (the time from the start of a case until the segment is reached), segment time (the time the case spent on the segment), and remaining time (the time the case spent between exiting the segment and the end of the case). Region 4 608 visualizes the weighted impact metric, as it shows how the segment performance relates to the overall performance, thereby providing the user with insight on the impact a segment has on the process as a whole.

FIG. 7 shows a dashboard 700 for the case perspective, in accordance with one or more embodiments. Dashboard 700 presents the analysis of case attributes to thereby allow a user to, for example, identify discrepancies between case attributes of the slowest class compared to the fastest class, which may reveal why there are discrepancies. Region 1 702 shows selectors for selecting, by a user, a segment to be analyzed and a set of classes to be analyzed. Region 2 704 shows a case attribute selector for selecting a case attribute on which analysis is to be performed and an "only show significant" option for showing only those attributes that are significantly different than expected based on prior research. Region 3 706 shows a chart where line 710 denote the expected frequency of the selected case attribute and the bars represent the observed frequency of the selected case attribute. Region 4 708 shows a table depicting how the selected case attribute is distributed over all classes. Region 4 708 includes a percentage/count selector for displaying the distribution as a percentage or a number (count).

FIG. 8 shows a dashboard 800 for the organization perspective, in accordance with one or more embodiments. The organization perspective relates to resources—i.e., which actors (e.g., people, systems, roles, departments) are involved and how are they related. Region 1 802 shows a selector for selecting a segment to analyze. Region 2 804 shows an event attribute selector for selecting an event attribute to be analyzes and a percentage/count selector for displaying distributions as a percentage or a number (count). Region 3 806 shows a table depicting distributions of the selected event attribute, per class, based on the segment activity. If "percentage" is selected, every row sums to 100%, allowing a user to inspect event attribute frequencies of the segment and compare the event attribute frequencies between different classes. Region 4 808 shows a table depicting distributions of the selected event attribute, per class, for the overall process.

Figure 9:
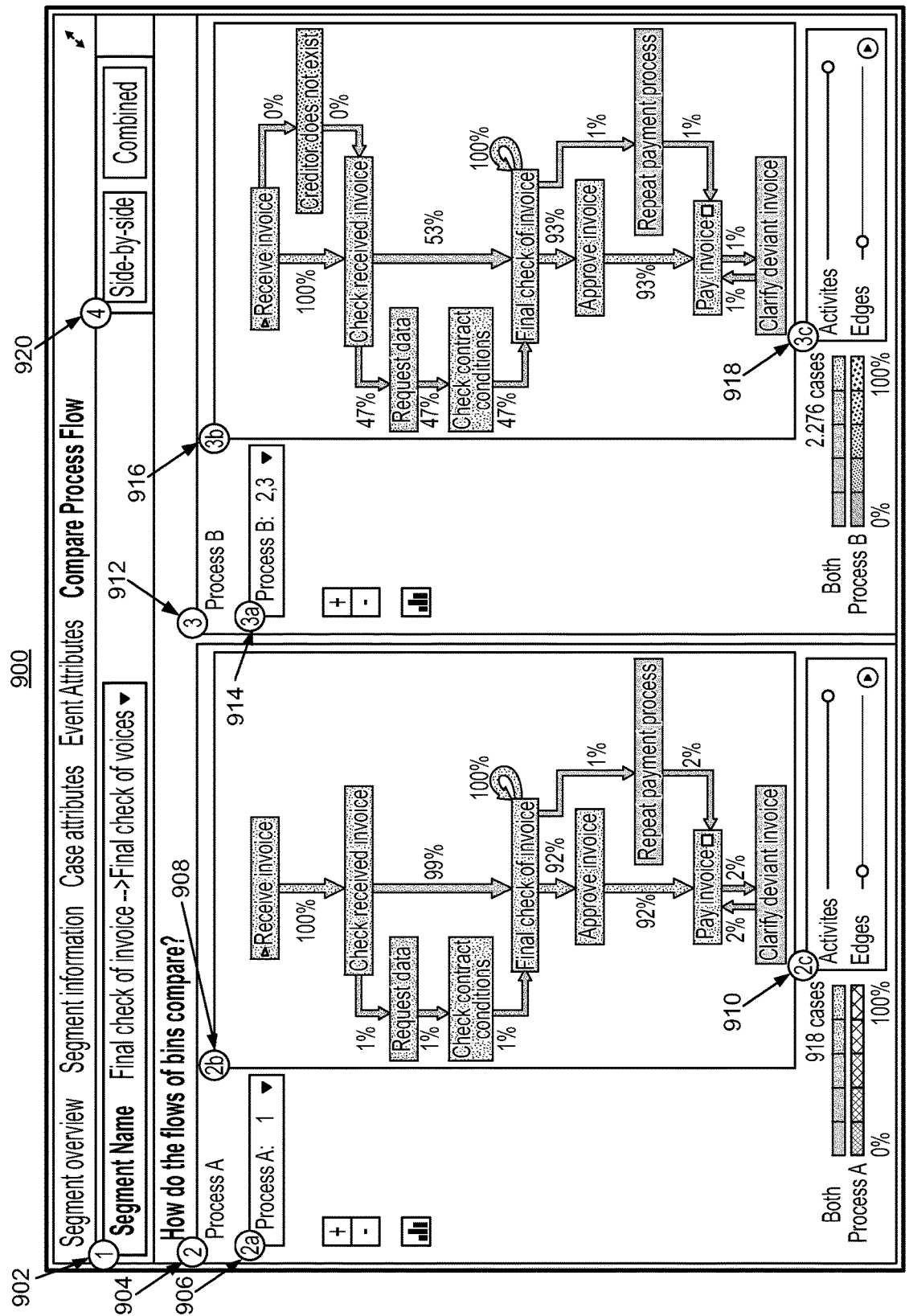
FIG. 9 shows a dashboard for a control-flow perspective of the analysis of a process, in accordance with one or more embodiments.
Figure 10:
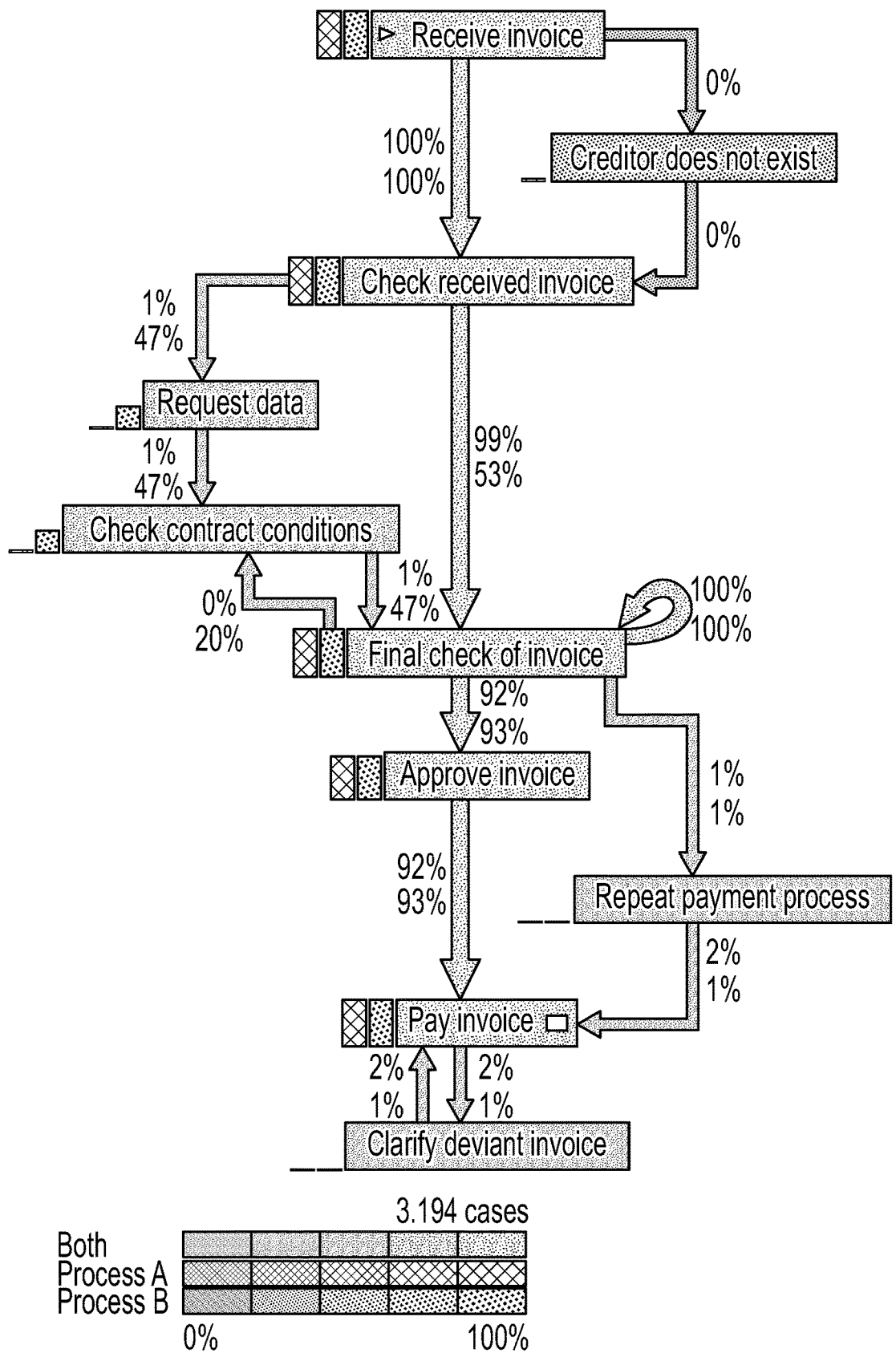
FIG. 10 shows a dashboard of a combined view of processes showing edge traversal rate for a control-flow perspective of the analysis of a process, in accordance with one or more embodiments.
Figure 11:
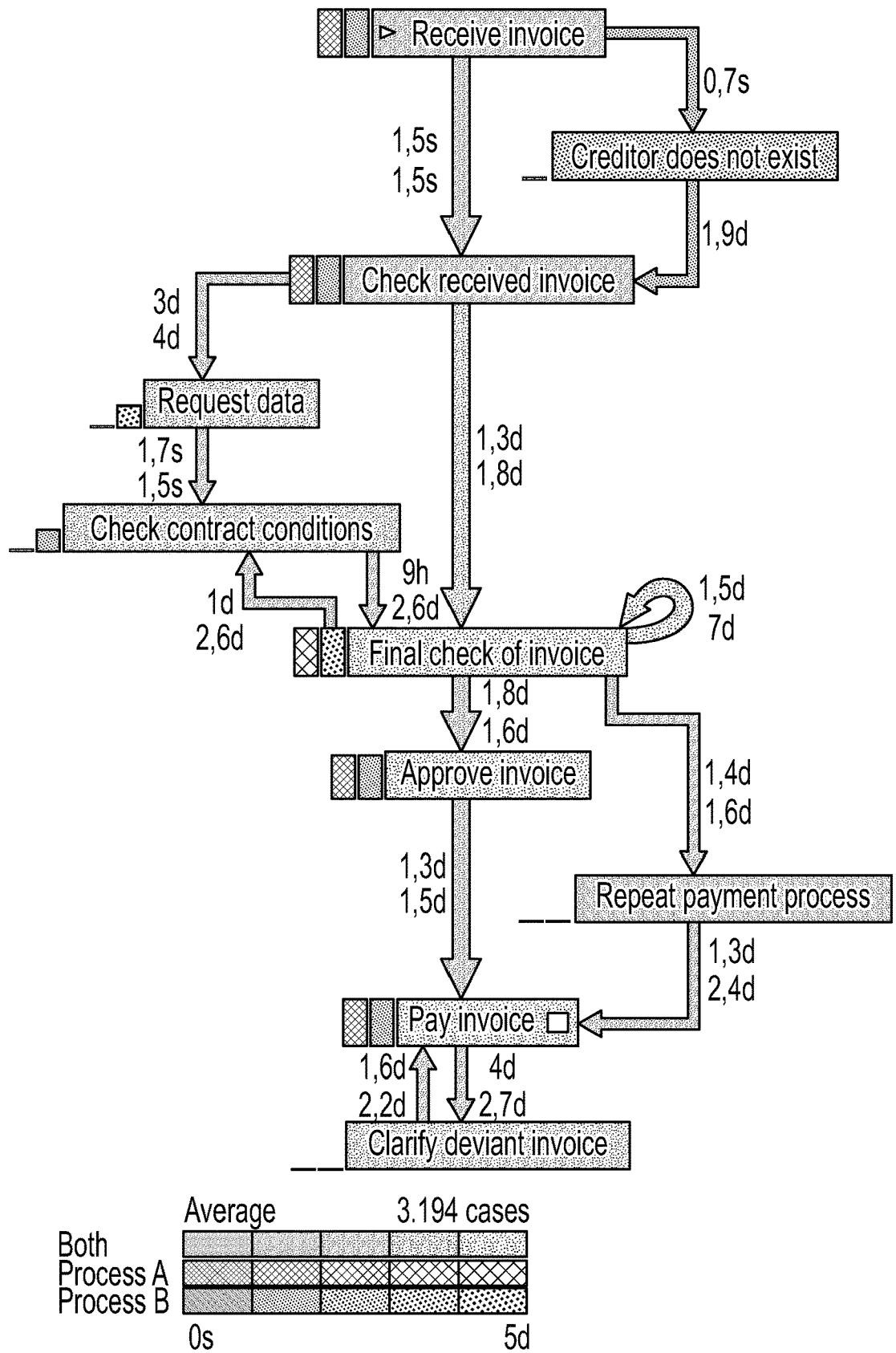
FIG. 11 shows a dashboard of a combined view of processes showing average throughput time for a control-flow perspective of the analysis of a process, in accordance with one or more embodiments.

FIG. 9 shows a dashboard 900 for the control-flow perspective, in accordance with one or more embodiments. Dashboard 900 allows a user to discover differences between the flow of one class with respect to other classes. The control-flow perspective relates to the ordering of activities. Region 1 902 shows a selector for selecting a segment to analyze. Region 2 904 shows process flow analysis tools. In particular, region 2 904 includes region 2a 906 showing a selector for selecting classes, region 2b 908 showing the process flow of the selected class where every edge shows a percentage of the cases that traverse it, and region 2c 910 showing a legend explaining the process utilization rate, number of cases, and comprises user adjustable sliders to set the threshold for hiding or showing infrequent activities and edges. Region 3 912 shows another process flow analysis tool. Region 3 912 includes regions 3a 914, 3b 916, and 3c 918, which are similar to regions 2a 906, 2b, 908, and 2c 910 but for another process. Region 4 920 shows buttons for selecting between showing the processes in a side-by-side view, as shown in dashboard 900, or in a combined view. FIGS. 10 and 11 show dashboard 1000 and dashboard 1100 respectively for the control-flow perspective showing a combined view of processes, in accordance with one or more embodiments. The processes are shown in dashboard 1000 and dashboard 1100 by color such that the Process A, Process B, and both processes are represented by different colors. Each edge in dashboard 1000 includes a percentage representing edge traversal rate for each process by color. Each edge in dashboard 1100 includes an average throughput time for each process by color. Other statistics may also be represented on the edges.

Referring back to method 200 of FIG. 2, in one embodiment, the event log received at step 202 is in a standard format, identifying only the executed activity, a single time stamp of the execution of the activity, and the case ID, as shown in event log 300 of FIG. 3. However, in other embodiments, the event log received at step 202 is in a non-standard format and converted into the standard format.

One example of an event log in a non-standard format is an event log comprising rows corresponding to each event and columns identifying a time stamp for an execution start time and a time stamp for an execution completion time for each of the events. Such an event log in a non-standard format is converted into a standard format by splitting each event into two separate events (i.e., two separate rows)—a first event corresponding to an execution start time and a second event corresponding to an execution completion time. In this example, it is possible to distinguish between types of segments being analyzed based on the execution start time and execution completion time. For instance, a segment from an event corresponding to an execution start time for a particular activity to an event corresponding to an execution completion time for the same activity may represent processing time, while a segment from an event corresponding to an execution completion time for an activity to an event corresponding to an execution start time for a next activity may represent waiting time. Accordingly, the detected bottleneck may be distinguished by type (i.e., due to processing time or due to waiting time).

Another example of an event log in a non-standard format is an event log comprising rows corresponding to each event and columns identifying activity lifecycle information for each event. Activity lifecycle information represents the status of an activity associated with an event. The status may be, e.g., start, complete, suspend, or resume. Such an event log in a non-standard format is converted into a standard format by modifying the label (i.e., name) of the activity to include the lifecycle information and removing the column identifying the activity lifecycle information. For example, a non-standard event log with a column identifying an activity label of "receive invoice" and a column identifying activity lifecycle information of "start" may be converted to have a column identifying the activity label of "receive invoice+start" and removing the column identifying activity lifecycle information. It is therefore possible to distinguish between types of segments based on the activity lifecycle information. For example, a segment from an event corresponding to a start execution for an activity to an event corresponding to a suspend execution for the activity may represent processing time, an event corresponding to a suspend execution for an activity to an event corresponding to a resume execution for the activity may represent waiting time, and an event corresponding to a resume execution for an activity to an event corresponding to a complete execution for the activity may represent processing time. Accordingly, the detected bottleneck may be distinguished by type (i.e., due to processing time or due to waiting time).

Figure 12:
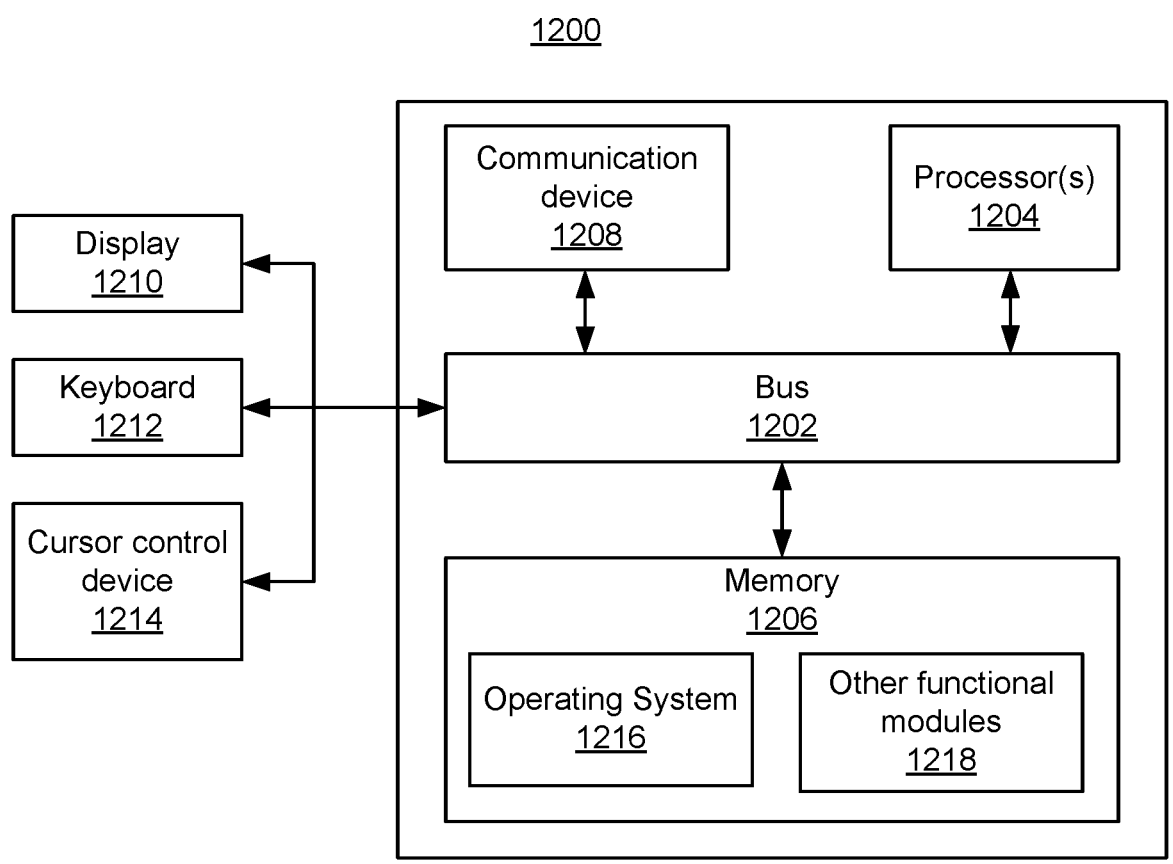
FIG. 12 is a block diagram of a computing system according to an embodiment of the invention.

FIG. 12 is a block diagram illustrating a computing system 1200 configured to execute the methods, workflows, and processes described herein, including FIGS. 1-2, according to an embodiment of the present invention. In some embodiments, computing system 1200 may be one or more of the computing systems depicted and/or described herein. Computing system 1200 includes a bus 1202 or other communication mechanism for communicating information, and processor(s) 1204 coupled to bus 1202 for processing information. Processor(s) 1204 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1204 may also have multiple processing cores, and at least some of the cores may be configured to perform specific functions. Multi-parallel processing may be used in some embodiments.

Computing system 1200 further includes a memory 1206 for storing information and instructions to be executed by processor(s) 1204. Memory 1206 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1204 and may include volatile media, non-volatile media, or both. The media may also be removable, non-removable, or both.

Additionally, computing system 1200 includes a communication device 1208, such as a transceiver, to provide access to a communications network via a wireless and/or wired connection according to any currently existing or future-implemented communications standard and/or protocol.

Processor(s) 1204 are further coupled via bus 1202 to a display 1210 that is suitable for displaying information to a user. Display 1210 may also be configured as a touch display and/or any suitable haptic I/O device.

A keyboard 1212 and a cursor control device 1214, such as a computer mouse, a touchpad, etc., are further coupled to bus 1202 to enable a user to interface with computing system. However, in certain embodiments, a physical keyboard and mouse may not be present, and the user may interact with the device solely through display 1210 and/or a touchpad (not shown). Any type and combination of input devices may be used as a matter of design choice. In certain embodiments, no physical input device and/or display is present. For instance, the user may interact with computing system 1200 remotely via another computing system in communication therewith, or computing system 1200 may operate autonomously.

Memory 1206 stores software modules that provide functionality when executed by processor(s) 1204. The modules include an operating system 1216 for computing system 1200 and one or more additional functional modules 1218 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for analyzing an event log for a plurality of instances of execution of a process to identify a bottleneck, comprising:
   identifying segments executed during one or more of the plurality of instances of execution from the event log, each of the segments representing a pair of activities of the process;
   for each particular segment of the identified segments:
      calculating a measure of performance for each of the one or more instances of execution of the particular segment based on the event log,
      classifying each of the one or more instances of execution of the particular segment based on the calculated measures of performance, and
      computing one or more metrics for the particular segment based on the classified one or more instances of execution of the particular segment; and
   comparing the identified segments with each other based on the one or more metrics to identify one of the identified segments that is most likely to have a bottleneck.

2. The computer-implemented method of claim 1, wherein the pair of activities comprises a source activity and a destination activity, where execution of the destination activity directly follows execution of the source activity in the event log.

3. The computer-implemented method of claim 1, wherein the measure of performance is a time interval between the pair of activities.

4. The computer-implemented method of claim 1, wherein classifying each of the one or more instances of execution of the particular segment based on the calculated measures of performance comprises:
   classifying each of the one or more instances of execution of the particular segment into one of a plurality of classes using a Jenks Natural Breaks Optimization algorithm.

5. The computer-implemented method of claim 1, wherein computing one or more metrics for the particular segment based on the classified one or more instances of execution of the particular segment comprises:
   computing 1) an effect size metric for the particular segment representing an average difference between classes of the particular segment, 2) a lost time metric for the particular segment representing a time difference between a best performing class and other classes of the particular segment, and 3) a weighted impact metric representing contribution of the particular segment to an overall performance.

6. The computer-implemented method of claim 5, wherein comparing the identified segments with each other based on the one or more metrics to identify one of the identified segments that is most likely to have a bottleneck comprises:
   ranking the identified segments based on the one or more metrics.

7. The computer-implemented method of claim 6, wherein ranking the identified segments based on the one or more metrics comprises:
   determining an individual ranking of the identified segments for each of the effect size metric, the lost time metric, and the weighted impact metric; and
   determining an aggregate ranking of the identified segments based on the individual rankings.

8. The computer-implemented method of claim 7, further comprising:
   identifying the one of the identified segments that is most likely to have the bottleneck based on the aggregate ranking.

9. The computer-implemented method of claim 1, further comprising:
   causing to display results of the comparing to identify the bottleneck.

10. The computer-implemented method of claim 1, wherein the process is a robotic process automation process.

11. An apparatus comprising:
a memory storing computer instructions for analyzing an event log for a plurality of instances of execution of a process to identify a bottleneck; and
at least one processor configured to execute the computer instructions, the computer instructions configured to cause the at least one processor to perform operations of:
identifying segments executed during one or more of the plurality of instances of execution from the event log, each of the segments representing a pair of activities of the process;
for each particular segment of the identified segments:
calculating a measure of performance for each of the one or more instances of execution of the particular segment based on the event log,
classifying each of the one or more instances of execution of the particular segment based on the calculated measures of performance, and
computing one or more metrics for the particular segment based on the classified one or more instances of execution of the particular segment; and
comparing the identified segments with each other based on the one or more metrics to identify one of the identified segments that is most likely to have a bottleneck.

12. The apparatus of claim 11, wherein the pair of activities comprises a source activity and a destination activity, where execution of the destination activity directly follows execution of the source activity in the event log.

13. The apparatus of claim 11, wherein the measure of performance is a time interval between the pair of activities.

14. The apparatus of claim 11, wherein classifying each of the one or more instances of execution of the particular segment based on the calculated measures of performance comprises:
classifying each of the one or more instances of execution of the particular segment into one of a plurality of classes using a Jenks Natural Breaks Optimization algorithm.

15. A computer program embodied on a non-transitory computer-readable medium for analyzing an event log for a plurality of instances of execution of a process to identify a bottleneck, the computer program configured to cause at least one processor to perform operations comprising:
identifying segments executed during one or more of the plurality of instances of execution from the event log, each of the segments representing a pair of activities of the process;
for each particular segment of the identified segments:
calculating a measure of performance for each of the one or more instances of execution of the particular segment based on the event log,
classifying each of the one or more instances of execution of the particular segment based on the calculated measures of performance, and
computing one or more metrics for the particular segment based on the classified one or more instances of execution of the particular segment; and
comparing the identified segments with each other based on the one or more metrics to identify one of the identified segments that is most likely to have a bottleneck.

16. The computer program of claim 15, wherein computing one or more metrics for the particular segment based on the classified one or more instances of execution of the particular segment comprises:
computing 1) an effect size metric for the particular segment representing an average difference between classes of the particular segment, 2) a lost time metric for the particular segment representing a time difference between a best performing class and other classes of the particular segment, and 3) a weighted impact metric representing contribution of the particular segment to an overall performance.

17. The computer program of claim 16, wherein comparing the identified segments with each other based on the one or more metrics to identify one of the identified segments that is most likely to have a bottleneck comprises:
ranking the identified segments based on the one or more metrics.

18. The computer program of claim 17, wherein ranking the identified segments based on the one or more metrics comprises:
determining an individual ranking of the identified segments for each of the effect size metric, the lost time metric, and the weighted impact metric; and
determining an aggregate ranking of the identified segments by based on the individual rankings.

19. The computer program of claim 18, the operations further comprising:
identifying the one of the segments that is most likely to have the bottleneck based on the aggregate ranking.

20. The computer program of claim 15, wherein the process is a robotic process automation process.

* * * * *